Aug. 27, 1974   R. A. ROHLFING   3,832,210

METHOD OF PREPARING A BIAS FABRIC

Original Filed July 17, 1970

United States Patent Office 3,832,210
Patented Aug. 27, 1974

3,832,210
METHOD OF PREPARING A BIAS FABRIC
Raymond A. Rohlfing, Englewood, Colo., assignor to
The Gates Rubber Company, Denver, Colo.
Original application July 17, 1970, Ser. No. 57,378, now abandoned. Divided and this application June 19, 1972, Ser. No. 263,838
Int. Cl. B41k 3/68
U.S. Cl. 117—4
1 Claim

ABSTRACT OF THE DISCLOSURE

A method of preparing a bias fabric from a tubular fabric having selvages, which method reduces or minimizes wrinkling or puckering of the fabric when it is stretched, pantographed or calendered. The bias fabric is cut from the tubular fabric in a manner that controls occurrence of selvages across the width of the bias fabric.

BACKGROUND OF THE INVENTION

This is a division of application Ser. No. 57,378, filed on July 17, 1970, now abandoned.

This invention relates to a method of preparing a fabric as a reinforcement for an article of manufacture but more particularly, the invention relates to a method of helically cutting strips of bias fabric from a length of tubular fabric.

Many articles of manufacture utilize a bias fabric as a structural reinforcement. Such a reinforcement is disclosed in United States Letters Patent Number 2,519,590 as issued to Mitchell. The Mitchell patent discloses use of a bias fabric to enhance life of a power transmission belt. This disclosure relates to preparing such a fabric. Tubular fabric is typically woven in a flattened and somewhat two-ply layer. Each edge of the flattened fabric tube has a noticeable concentration of longitudinal or warp threads. The concentration of warp threads is induced by the weaving process and is referred to in the art as selvage. When a strip of bias material is helically cut from a length of tubular fabric and flattened, the selvages appear as spaced apart diagonal and parallel lines. As the strip of bias fabric is handled such as during rolling, stretching or calendering, the bias fabric is apt to pucker or bag. The selvages cause a strength unbalance in the fabric because each selvage is, for example, tensionally stronger than fabric juxtaposed thereto. Stretching, pantographing or calendering the bias fabric augments occurrence of fabric puckering, bagging or wrinkling as the selvages induce a force unbalance across the fabric. The wrinkled fabric areas may have to be scraped especially when the fabric has been calendered with an elastomeric material.

SUMMARY OF THE INVENTION

The invention identifies a method of helically cutting a strip of bias fabric to control occurrence of selvages across the width of the bias fabric. Controlling occurrence of selvages across the width of the bias fabric reduces puckering or wrinkling as the bias fabric is stretched, pantographed or calendered.

It is an object of the invention to provide a method of helically cutting a strip of bias fabric from a length of tubular fabric which method controls the occurrence of selvage across the width of bias fabric.

Another object of the invention is to provide a method of preparing a bias fabric reinforcement with minimum waste resulting from fabric wrinkling or puckering.

Yet another object of the invention is to provide a method of preparing a bias fabric from a fabric tube which method promotes uniformity of the bias fabric threads by reducing wrinkling or puckering when the bias fabric is calendered with an elastomeric material, stretched or pantographed.

Other advantages or objects of the invention will become apparent upon review of the appended drawings and description thereof wherein.

TECHNICAL DISCLOSURE

Figures 1, 2:
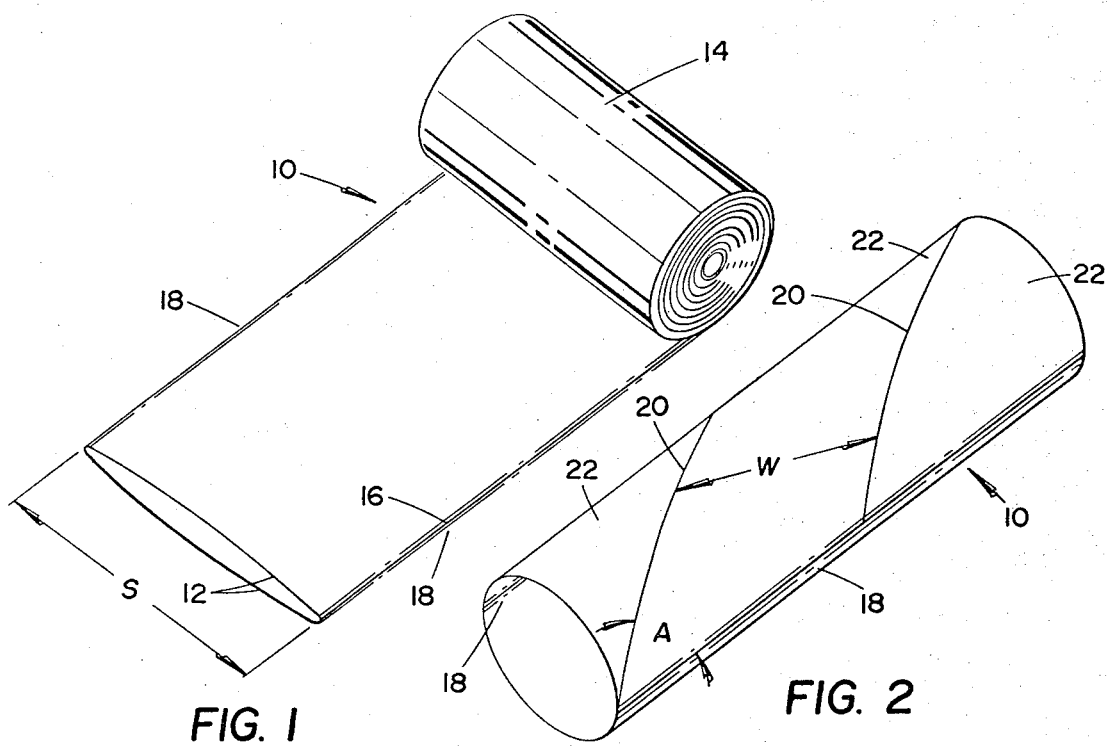
FIG. 1 is a perspective view of a roll of tubular fabric
FIG. 2 is a perspective view of a length of expanded tubular fabric.

Referring to FIG. 1, tubular fabric 10 is usually woven in a flattened and somewhat two-ply layer 12 of any convenient width, and wound into a roll 14. The flat weaving process causes a concentration of warp (longitudinal) threads 16 at the edges of the flattened tubular fabric. The concentration of warp threads appear as an interwoven "stripe" or "line" in the fabric which is known in the art as selvage 18.

There are two selvages 18 in tubular fabric. It is readily seen that the distance S between the selvages is equivalent to the width of the flattened tubular fabric 10. In other terms, the distance S is equivalent to half the circumference of the tubular fabric 10.

When the flattened tubular fabric 10 of FIG. 1 is expanded, it appears as a cylindrical tube as shown in FIG. 2. The selvages 18 appear as diametrically opposed stripes along the length of tubular fabric 10. As a cylinder, the tubular fabric 10 may be helically cut 20 in one or more places at a helix angle A to form one or more strips of bias fabric 22. The flattened width S of the tubular fabric 10 and the helical cuts 20 are determinative of the width W of the bias fabric 22.

Figure 3:
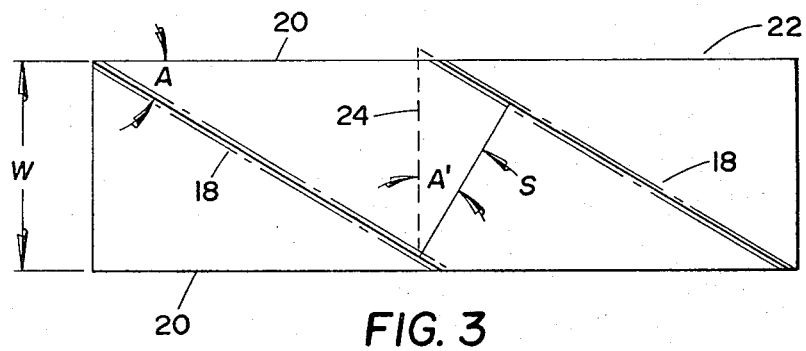
FIG. 3 is a plan view of a strip of bias fabric of this invention.

Referring now to FIG. 3, a flattened strip of bias fabric 22 cut in accordance with the invention is shown. Only one selvage 18 appears across the width W of the bias fabric 22 at any given point. The selvages 18 appear as parallel stripes running diagonally across the bias fabric 22, the perpendicular distance between selvages being equivalent to the flattened width S of the tubular fabric 10. The selvages 18 run diagonally of the bias fabric at an angle A which is equivalent to the helix angle A of FIG. 2.

Factors determinative of occurrence of only one selvage 18 across the width W of the bias fabric 22 are: (1) the width W of the bias fabric 22; (2) the width S or circumference of the flattened tubular fabric 10; and (3) the bias or helix angle A. The distance S may be projected to define a line 24 which is perpendicular to the cut edge 20 of the bias fabric 22. The line 24 then makes an angle A' in relation to S. Angle A' is equivalent to the helix or bias angle A. The length of the line 24 may be expressed as the ratio of S to the cosine of A. It may now be readily understood that if the ratio of S:cos A is always equal to or greater than W, then only one selvage 18 can occur across the bias fabric at a given point. Mathematically the relation may be expressed by the unequality:

$$\frac{S}{\cos A} \geq W$$

As previously mentioned, S is equivalent to half the circumference of the tubular fabric. For convenience, the circumference may be denoted as C.

After cutting, the bias fabric 22 may be further processed by rolling or stretching (pantographing) while simultaneously being calendered with an elastomeric material.

Figure 4:
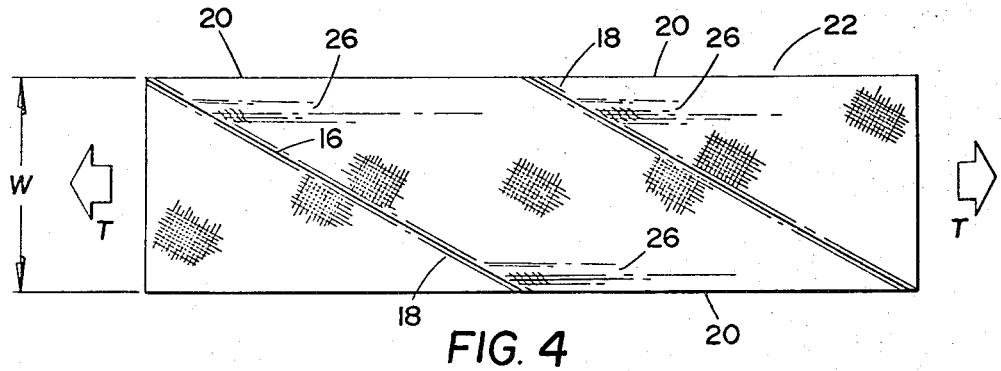
FIG. 4 is a plan view of a strip of bias fabric being tensioned.

Referring to FIG. 4, a strip of bias fabric 22 is shown being stretched or tensioned by a tensioning means, not shown. The tensioning means may include spaced apart pairs of pinch rollers or a calender in combination with a pair of pinch rollers. The tensioning means attempts to impart a uniform tensional force T-T across the width W of the bias fabric 22. However, the concentration of warp threads 16 causes the fabric at the selvage 18 to be tensionally stronger than fabric juxtaposed thereto. Consequently, uneven force distribution across the width of the fabric causes a relief or distortion 26 of the fabric. Here, it should be emphasized with particularity that bias fabric cut in accordance with the invention has only one selvage 18 occurring across its width at any given point. Occurrence of only one selvage across the bias fabric allows unbalanced tensional forces to be relieved 26 at the cut edges 20. With only one selvage 18, the bias fabric distorts 26, but does not substantially bag or pucker to cause a fabric overlay. An elastomeric may be calendered on the fabric during tensioning without the complication of fabric overlap. After calendering with an elastomeric material, the bias fabric is ready for inclusion into an article of manufacture.

When bias fabric is pantographed by stretching, the threads of the fabric move angularly in relation to each other. A concentration of warp threads at the selvages reduces the spacing between threads which hampers their ability to pantograph. Consequently, a second force unbalance is introduced into the bias fabric by the selvages. Here again, bias fabric cut in accordance with the invention has only one selvage occurring across its width and the source of force unbalance within the fabric is minimized.

Occurrence of more than one selvage across the width of the bias fabric prevents uneven tensional force from relieving at the cut edges. The tensional forces are blocked from relief at the cut edges because of a second selvage simultaneously occurring across the fabric width. The second selvage is tensionally stronger than fabric adjacent thereto. Consequently, fabric around the second selvage may pucker or bag and finally overlap as the fabric reaches a state of equilibrium. Should an elastomeric be added to the fabric by simultaneously tensioning and calendering, the puckered and overlap areas become waste.

The foregoing detailed description was made for purpose of illustration only and is not intended to limit the scope of the invention which is to be determined from the appended claim.

What is claimed is:

1. A process for preparing a fabric reinforcement for inclusion into a rubber article comprising the steps of:

helically cutting a length of flatly and generally squarely woven tubular fabric having spaced and substantially parallel selvages at a helical angle less than forty-five degrees and forming strips of bias fabric having widths such that the cut widths of the strips of bias fabric is less than the ratio of the selvage spacing to the cosine of the helical angle whereby only one selvage occurs across the widths of the bias fabric strips and longitudinally stretching said strips of bias fabric while simultaneously calendering said strips of bias fabric with a pliant elastomeric material.

References Cited

UNITED STATES PATENTS

| | | | |
|---|---|---|---|
| 2,343,109 | 2/1944 | Evans | 117—163 UX |
| 2,355,038 | 8/1944 | Barnard | 117—4 X |
| 2,386,761 | 10/1945 | Wetherbee | 117—7 |
| 2,519,590 | 8/1950 | Mitchell | 74—231 R |
| 2,520,699 | 8/1950 | Sowerby et al. | |
| 2,953,477 | 9/1960 | Evans | 117—4 X |

WILLIAM D. MARTIN, Primary Examiner

T. G. DAVIS, Assistant Examiner

U.S. Cl. X.R.

117—7